US012596731B2

(12) United States Patent
Heisler et al.

(10) Patent No.: US 12,596,731 B2
(45) Date of Patent: Apr. 7, 2026

(54) SYSTEM AND METHOD OF EFFICIENT KNOWLEDGE-ENHANCED CHAIN-OF-THOUGHT PROMPTING

(71) Applicants: Morgan Lindsay Heisler, Burnaby (CA); Chendi Wang, Vancouver (CA); Gursimran Singh, Delta (CA); Yong Zhang, Burnaby (CA)

(72) Inventors: Morgan Lindsay Heisler, Burnaby (CA); Chendi Wang, Vancouver (CA); Gursimran Singh, Delta (CA); Yong Zhang, Burnaby (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 165 days.

(21) Appl. No.: 18/407,027

(22) Filed: Jan. 8, 2024

(65) Prior Publication Data

US 2025/0225160 A1      Jul. 10, 2025

(51) Int. Cl.
| *G06F 16/334* | (2025.01) |
| *G06F 16/3329* | (2025.01) |
| *G06F 40/30* | (2020.01) |
| *G06F 40/40* | (2020.01) |
| *G10L 15/30* | (2013.01) |

(52) U.S. Cl.
CPC .......... *G06F 16/3329* (2019.01); *G06F 40/30* (2020.01); *G06F 40/40* (2020.01); *G06F 16/3341* (2019.01); *G10L 15/30* (2013.01)

(58) Field of Classification Search
CPC ............................. G06F 16/3344; G10L 15/30
See application file for complete search history.

(56) References Cited

U.S. PATENT DOCUMENTS

| 2006/0235696 A1* | 10/2006 | Bennett ................. G06F 40/289 |
| | | 704/E15.04 |
| 2009/0292687 A1* | 11/2009 | Fan .......................... G06N 5/02 |
| | | 707/999.005 |

FOREIGN PATENT DOCUMENTS

| CN | 106095932 B | * 12/2019 | ............ G06F 40/211 |
| CN | 114090746 A | * 2/2022 | ......... G06F 16/3344 |
| CN | 113569023 B | * 10/2024 | ............ G06F 18/22 |

OTHER PUBLICATIONS

Wang, et al., "Keqing: Knowledge-Based Question Answering is a Nature Chain-of-Thought Mentor of LLM," arXiv, Dec. 31, 2023. (Year: 2023).*
Wang, et al., "Keqing: Knowledge-Based Question Answering is a Nature Chain-of-Thought Mentor of LLM," arXiv, Dec. 31, 2023. (Year: 2023) (Year: 2023).*
Wang, et al. "Keqing: Knowledge-Based Question Answering is a Nature Chain-of-Thought Mentor of LLM," arXiv, Dec. 31, 2023 (see attached copy in the previous Office action). (Year: 2023).*

(Continued)

*Primary Examiner* — Feng-Tzer Tzeng

(57) ABSTRACT

Methods and systems for processing a natural language input query that includes a question and a respective set of candidate answers for the question, including generating, based on the input query and a knowledge graph, natural language logic paths between at least some of the candidate answers and the question; forming a natural language prompt based on both the input query and the logic paths; and obtaining a response from a pretrained natural language processing model based on the natural language promp.

18 Claims, 8 Drawing Sheets

(56)                    References Cited

OTHER PUBLICATIONS

Wei, Jason et al. "Chain-of-Thought Prompting Elicits Reasoning in Large Language Models." 36th Converence on Neural Information Processing Systems (NeurIPS 2022). arXiv:2201.11903v6[cs. CL] Jan. 10, 2023.

Chen, Xiang et al. "KnowPrompt: Knowledge-aware Prompt-tuning with Synergistic Optimization for Relation Extraction". In Proceedings of the ACM Web Conference 2022 (WWWW'22), Apr. 25-20, 2022, Virtual Event, Lyon, France, 11 pages. https://doi.org/11.45/3485447.3511998.

Ling, Chen et al. "Knowledge-enhanced Prompt for Open-domain Commonsense Reasoning". Nov. 2022.

Yasunaga, Michihiro et al. "QA-GNN: Reasoning with Language Models and Knowledge Graphs for Question Answering". arXiv:2104. 06378v5 [cs.CL] Dec. 13, 2022.

* cited by examiner

Figure 7:
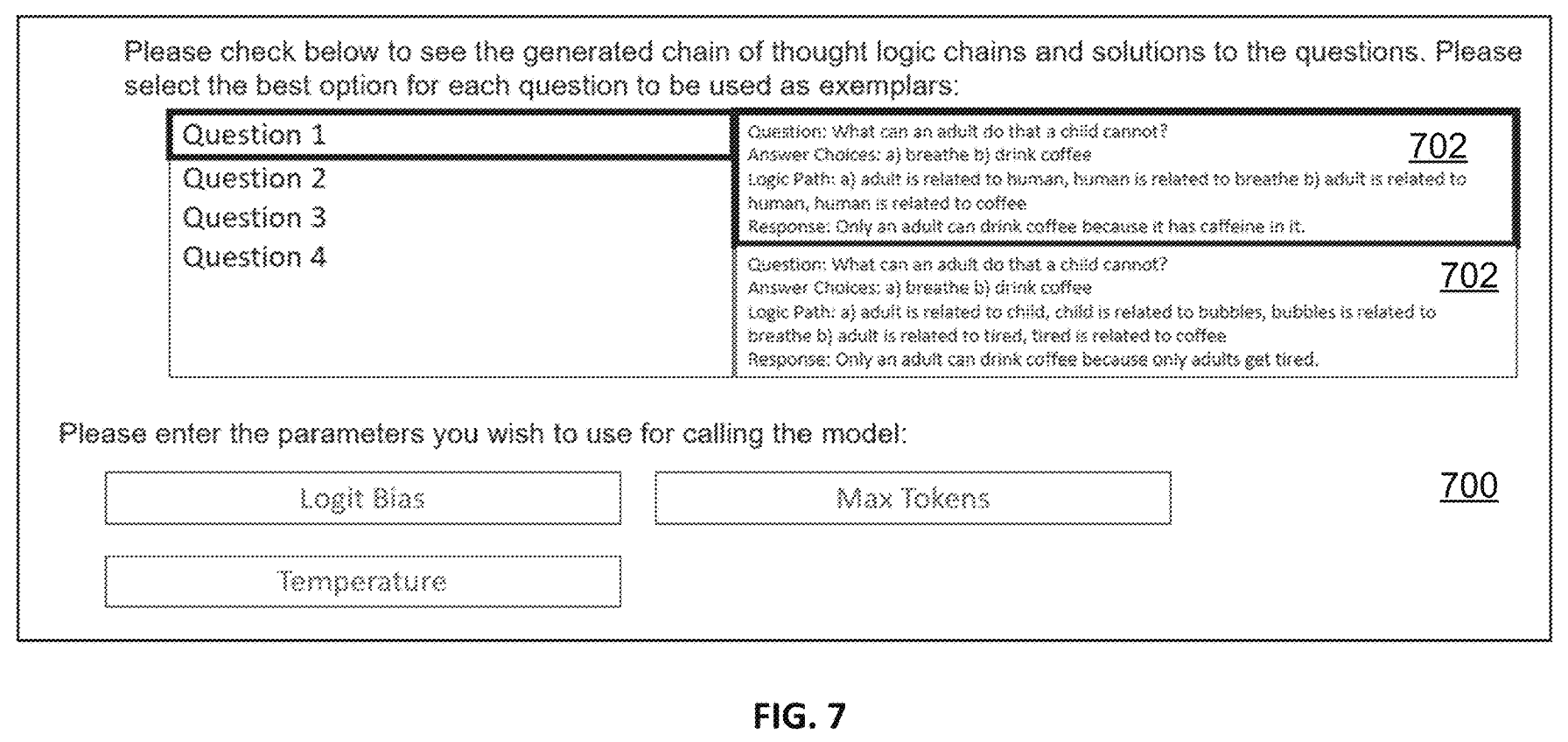

Please check below to see the generated chain of thought logic chains and solutions to the questions. Please select the best option for each question to be used as exemplars.

Question 1

Question 2

Question 3

Question 4

Question: What can an adult do that a child cannot?
Answer Choices: a) breathe b) drink coffee
Logic Path: a) adult is related to human, human is related to breathe b) adult is related to
human, human is related to coffee
Response: Only an adult can drink coffee because it has caffeine in it.

702

Question: What can an adult do that a child cannot?
Answer Choices: a) breathe b) drink coffee
Logic Path: a) adult is related to child, child is related to bubbles, bubbles is related to
breathe b) adult is related to tired, tired is related to coffee
Response: Only an adult can drink coffee because only adults get tired.

702

Please enter the parameters you wish to use for calling the model:

Logit Bias

Temperature

Max Tokens

SYSTEM AND METHOD OF EFFICIENT KNOWLEDGE-ENHANCED CHAIN-OF-THOUGHT PROMPTING

TECHNICAL FIELD

The present disclosure relates to methods and systems for improving the efficiency and accuracy of a natural language processing computer system through the application of knowledge-enhanced chain-of-thought prompting.

BACKGROUND

Knowledge can be implicitly encoded in pre-trained language models (PLMs), or explicitly represented in knowledge graphs (KGs), where entities and their relations are represented as nodes and edges. Recently, PLMs have demonstrated remarkable success in many question answering datasets. However, while PLMs have a broad coverage of knowledge, they do not empirically perform well on structured reasoning tasks. On the other hand, KGs are more suited for structured reasoning and enable explainable predictions, but can lack knowledge coverage and provide inconsistent results depending on how the KG's were constructed.

An additional problem is how to unlock the reasoning capabilities of a PLM in a way that a human can understand, which helps further improve the prediction performance of a PLM. Recent work on chain-of-thought prompting has enabled such an output by using few-shot prompting. Using chain-of-thought prompting enables one to simply "prompts" a PLM with a few input-output exemplars demonstrating the task, instead of fine-tuning a separate language model checkpoint for each new task, one. The exemplar can consist of triples: <input, chain of thought, output> where a chain of thought is defined as a series of intermediate natural language reasoning steps that lead to the final output, such as an answer to a multiple choice question. While this method improves the accuracy of commonsense reasoning on most PLMs, it still lacks structured knowledge that can be found in knowledge graphs.

Accordingly, there is a need for systems and methods that improve the accuracy and efficiency of natural language processing computer systems in generating answers to questions.

SUMMARY

According to a first example aspect, a computer-implemented method is disclosed for processing a natural language input query that includes a question and a respective set of candidate answers for the question. The method includes: generating, based on the input query and a knowledge graph, natural language logic paths between at least some of the candidate answers and the question; forming a natural language prompt based on both the input query and the logic paths; and obtaining a response from a pretrained natural language processing model based on the natural language prompt.

In some examples of the first example aspect, generating the natural language logic paths includes identifying a question entity for the question included in the input query; identifying a respective candidate answer entity for each of the candidate answers included in the input query; identifying, for the question entity, a matching question node entity of the knowledge graph; identifying, for at least some of the candidate answer entities, respective matching node answer entities of the knowledge graph; and identifying, based on inter-node entity relationships specified in the knowledge graph, a respective logic path for each matching node answer entity to the matching question node entity, the natural language logic paths corresponding to the identified respective logic paths.

In one or more of the preceding examples of the first example aspect, identifying the matching question node entity for the question entity is based on a comparison of an embedding generated for the question entity with embeddings generated for node entities of the knowledge graph; and identifying the respective matching node answer entities for the at least some of the candidate answer entities is based on a comparison of embeddings generated for the candidate answer entities with embeddings generated for the node entities of the knowledge graph, the embeddings each being generated by a neural network model that has been pre-trained to generate similar embeddings for terms having semantically similar meanings.

In one or more of the preceding examples of the first example aspect, identifying the respective logic path for each matching node answer entity to the matching question node entity includes: identifying, for each matching node answer entity, a respective set of candidate logic paths for the matching node answer entity to the matching question node entity; ranking each of the candidate logic paths within each of the respective sets of candidate logic paths; and selecting as the respective logic path for each matching node answer entity the candidate logic path having the highest ranking from the respective set of candidate logic paths for the matching node answer entity.

In one or more of the preceding examples of the first example aspect, identifying the respective set of candidate logic paths for each matching node answer entity is limited to paths that fall within a predefined number of entity node hops.

In one or more of the preceding examples of the first example aspect, identifying the question entity for the question comprises applying a keyphrase extraction tool to the question to extract the question entity.

In one or more of the preceding examples of the first example aspect, forming the natural language prompt comprises combining content from the input query, the logic paths and one or more exemplars to form the natural language prompt, wherein each exemplar includes a representation of an example natural language prompt combined with an example response thereto, each example natural language prompt comprising a respective example question and set of example candidate answers together with example logic paths between the example question and the example candidate answers.

In one or more of the preceding examples of the first example aspect, the response indicates a selected answer from the set of candidate answers and a natural language chain-of-thought statement for the selected answer.

In one or more of the preceding examples of the first example aspect, the method includes receiving the input query over a network from a requesting device and providing the response over the network to the requesting device.

In one or more of the preceding examples of the first example aspect, the method includes receiving the knowledge graph over the network from the requesting device.

According to a further example aspect, a computing system is disclosed that includes a processing unit configured to execute computer-readable instructions to cause the system to perform a method according to any of the preceding examples of the first example aspect.

A non-transitory computer-readable medium having instructions stored thereon, wherein the instructions are executable by a processing unit of a computing system to cause the computing system to perform a method according to any of the preceding examples of the first example aspect.

BRIEF DESCRIPTION OF THE DRAWINGS

Reference will now be made, by way of example, to the accompanying drawings which show example embodiments of the present application, and in which:

FIG. 7 is an illustrative example of a third graphical user interface presented by the user device, according to example implementations.

Similar reference numerals may have been used in different figures to denote similar components.

DETAILED DESCRIPTION

Figure 1:
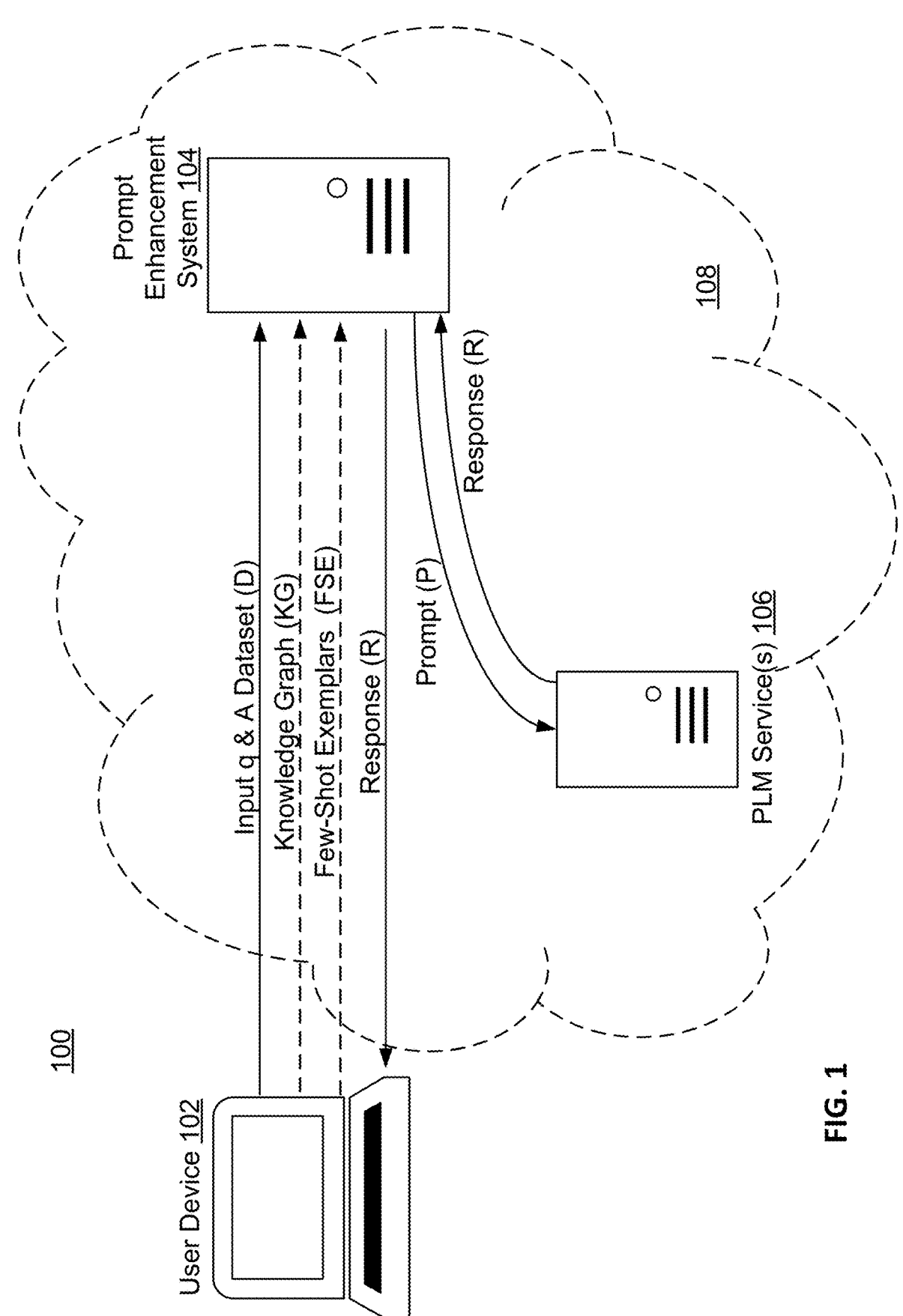
FIG. 1 is a block diagram of an example natural language processing environment to which examples of the systems and methods described in the present disclosure can be applied.

The present disclosure is directed towards systems and methods that assemble and apply knowledge-enhanced chain-of-thought prompting. Such systems and methods can improve the operation of the computer system(s) (e.g., improve computer system efficiency) to which they are applied.

To assist in understanding the present disclosure, a description of selected terminology used herein is first provided. The following terms can have the following meanings as used herein unless the specific context requires otherwise.

Knowledge Graph (KG): A knowledge base data structure that uses a graph-structured data model or topology to represent entities and the relationship between those entities. A KG can be defined as a multi-relational graph $\mathcal{G}$, where $\mathcal{G}=(\mathcal{V},\mathcal{E})$; $\mathcal{V}$ represents the set of entities (each entity is represented as a node, referred to hereafter as a node entity) in graph $\mathcal{G}$; $\mathcal{E}\subseteq\mathcal{V}\times\mathcal{R}\times\mathcal{V}$ is the set of edges that connect the entities $\mathcal{V}$ in graph $\mathcal{G}$; and $\mathcal{R}$ represents a set of relationship types. A graph KG can be represented as a set of tuples, for example a 3-tuple such as <head (h), relation (r), tail (t)> (i.e., a triplet form data element) where the head and tail are two separate KG node entities connected by a relation r. Each tuple represents a connection from one KG entity to another KG entity. Node entities h, t can each take the form of natural language terms that represent things such as people, places, objects or concepts. Relations r take can take the form of words or phrases that describe the relationship between related entities. An illustrative example of a knowledge graph tuple is <Justin Trudeau, Prime Minister_of, Canada>. In the example, Justin Trudeau and Canada are node entities and "Prime Minister_of" is the relation between the entities. Note that the knowledge graph can be very densely connected as there can be multiple tuples to cover different relationships between Justin Trudeau and Canada, such as <Justin Trudeau, lives_in, Canada>, <Justin Trudeau, born_in, Canada>, etc., as well as further tuples defining relationships between Canada and other entities such as <Canada, next_to, United States of America>, <Stephen Harper, was_prime_minister_of, Canada> and (Lacrosse, national_sport_of, Canada). In some examples, the data elements used for a knowledge graph can be 2-tuples such as <head (h), tail (t)>, which specifies that a connection exists between the two member node entities but does not specify any detail about that connection, for example <car, road> indicates that a connection exists between a car and a road but does not specify the nature the nature of the relationship.

Pre-trained Language Model (PLM): Large neural networks (NNs) that are used in a wide variety of natural language processing (NLP) tasks. PLMs can, in some examples, operate under a pretrain-finetune paradigm: Models are first pretrained over a large text corpus and then finetuned on a downstream task. Examples of PLMs include the ChatGPT™ models provided by OpenAI™.

Prompting: A method of instructing a PLM via a prompt in the form of a natural language statement so that the PLM will attempt to generate an output to match the context or pattern of the prompt provided to it.

Few Shot prompting: Few-shot prompting is a technique where a PLM is given a small number of examples (also referred to as examplars), typically between two and five as part of a prompt, in order to quickly adapt to new examples of previously seen objects.

Logic path: A route between two entities represented as nodes on a knowledge graph that outlines a series of logical steps that connect the entities. A logic path can include one or more hops.

Chain of Thought: A series of one or more intermediate natural language reasoning steps that lead to a final output. A chain of thought can be represented by text in a chain of thought statement.

Interpretable/Explainable: The ability to note which concepts are important for target outputs, and how a logic path/relationship between entities help to shape the conclusion on decision making.

Structured reasoning: Structured reasoning is the ability to reason in terms of general structures, such as that of a knowledge graph. Knowledge encapsulated in a KG can be considered symbolic, rather than the semantic knowledge captured in natural language, and therefore are subject to logical structuring that can be used for reasoning. An example would be "If A exists then B must be true", or "If X has relation Y to Z, then Z has relation W to V".

Retraining: A PLM that has already been trained can be trained again to update the model to adapt to target application scenarios. This is done in practice either on a schedule or when triggered by a specific event, such as a new product release.

Efficiency: the ability to improve operation of a computer system, including for example the use a PLM and KG together with in a manner that mitigates against wasted use of computer or network resources or energy. Examples of improved operation can include for example optimizing the number of computational and/or network communication-related activities required to achieve an accurate result. An efficient solution can, for example, eliminate the need to retrain or fine-tune any model (such as the PLM, another NLP model or graph neural network) for the purpose of combining the knowledge inherent in a PLM with the structured knowledge included in an KG, thereby reducing the use of computational resources and energy within a system of one or more computers, while at the same time enabling an accurate answer to be provided.

FIG. 1 is a block diagram of an example natural language processing environment 100 to which examples of the systems and methods described in the present disclosure can be applied. In the illustrated example, environment 100 includes a user device 102, a prompt enhancement system 104, and a pretrained language model (PLM) service 106 that are each enabled to communicate with a communications network 108 that can, for example, include the Internet. By way of example, user device 102 may be a computer system such as a laptop, desktop, server, tablet, smartphone, or other processor enabled device that is configured to provide a human-machine interface. Prompt enhancement system 104, for example, can be a computer system comprising one or more servers. As will be explained in greater detail below, in an example implementation the prompt enhancement system is configured to function as an interface service between user device 102 and one or more PLM services 106. PLM service 106, for example, can be a computer system comprising one or more servers that host one or more pre-trained language models that are configured to provide natural language responses (R) to natural language prompts (P). In example implementations, user device 102, prompt enhancement system 104 and PLM service 106 are computer systems that are configured by computer executable instructions to perform the respective functions described below. In some example implementations, one or more of the functions described in respect of the above components (e.g., user device 102, prompt enhancement system 104 and/or PLM service 106) can be consolidated onto a single component or performed by other components within the environment 100. In some example implementations, one or both of prompt enhancement system 104 and PLM service 106 can be implemented as cloud-based services. An example of a computer system architecture that can be used to implement one or more of the components of FIG. 1 is described below.

Figure 2:
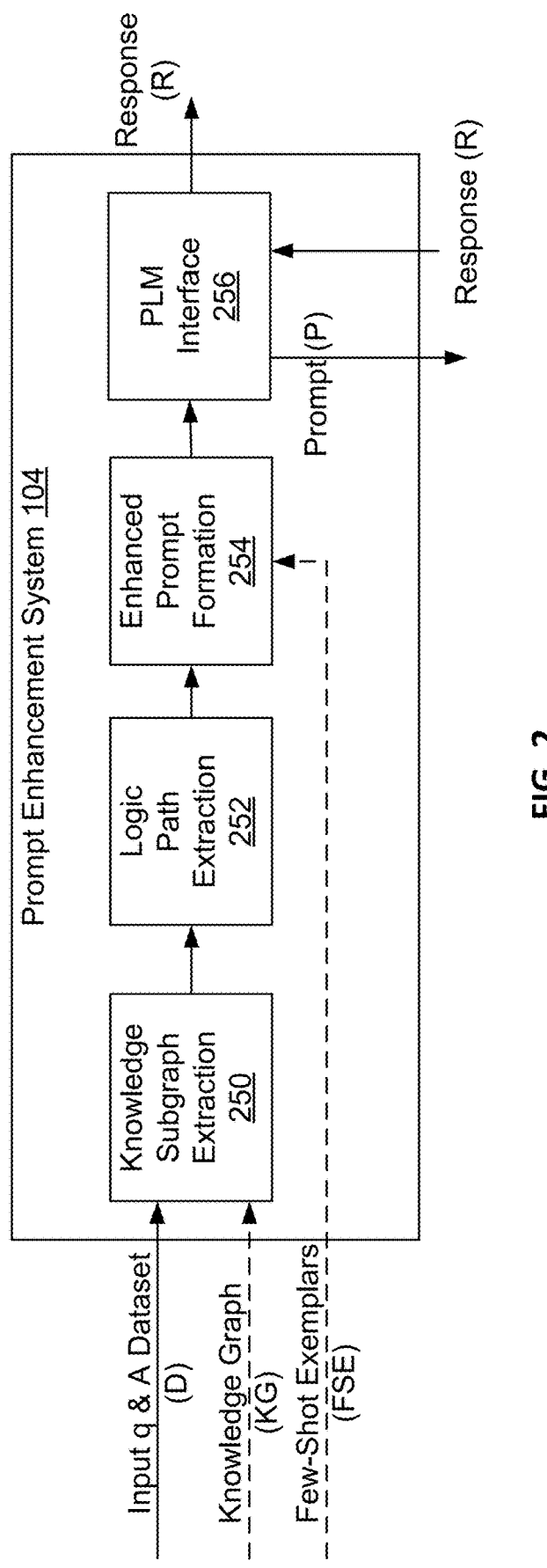
FIG. 2 is a block diagram showing operations that can be performed by a prompt enhancement system included in the environment FIG. 1, according to example implementations.

FIG. 2 shows an example of operations that can be performed by the prompt enhancement system 104 in example embodiments.

In the illustrated example, the prompt enhancement system 104 obtains the following inputs:

(1) A dataset D of questions (also referred to as problems) and, for each question (q), a respective set of candidate answers (A), denoted as $D=\{(q_i, A_i)\}_{i=1\ to\ Nd}$, where Nd is the number of question and candidate answer sets in dataset D. In the present example, for the sake of simplicity, Nd=1 is used, and subscript i is omitted from future references to question q and candidate answers A. In the illustrated example the q&A dataset D is received by the prompt enhancement system 104 through network 108 from a requesting user device 102 as a query.

(2) A knowledge graph KG that relates to the q&A dataset. In this regard, the knowledge graph KG will include node entities that the questions and/or answers in the q&A dataset D can be mapped to. In the illustrated example the knowledge graph KG may be received by the prompt enhancement system 104 through network 108 from requesting user device 102 as part of the query. In some examples, knowledge graph KG may pre-stored at the prompt enhancement system 104 or available from a third party service as part of a set of one or more knowledge graphs KGs. In some examples, a knowledge graph KG selection indicator indicating a desired knowledge graph may be included in a request received from the user device 102 as part of the query. By way of illustrative example, the open source ConceptNet knowledge graph, which represents words and phrases that people use and the common-sense relationships between them, can be used as a general domain KG for many common use-case scenarios.

(3) A set of one or more Few-Shot Exemplars FSEs, where each exemplar provides a natural language example of a question, and set of candidate answers to the question, and a response that includes an answer selected from the set of candidate answers and a chain-of-thought statement for the selected answer. In the illustrated example, the Few-Shot Exemplars FSEs may be received by the prompt enhancement system 104 through network 108 from requesting user device 102 as part of the query. In some examples, Few-Shot Exemplars FSEs may pre-stored at the prompt enhancement system 104 or available from a third party service. In some examples, a Few-Shot Exemplars FSEs selection indicator indicating a desired set of one or more one or more Few-Shot Exemplars FSEs may be included in a request received from the user device 102 as part of the query. In a zero-shot setting example the Few-Shot Exemplars FSEs may be omitted and are not obtained or used by the prompt enhancement system 104.

The prompt enhancement system 104 uses these inputs to assemble an enhanced prompt P to obtain a corresponding response R from a PLM, which in the illustrated example is hosted by PLM service 106. The response R that includes both an answer selection from the candidate answers and a chain-of-thought statement explaining the answer. The response R is sent by the prompt enhancement system 104 (or, in some examples, directly by the PLM service 106) to the user device 102 via network 108.

Processing of the above noted inputs (e.g., q&A dataset D, knowledge graph KG, and few-shot exemplars (FSEs) to obtain response R will now be explained in greater detail according to an example implementation. As shown in FIG. 2, the prompt enhancement system 104, in the illustrated example, is configured to perform the following operations: knowledge subgraph extraction 250; logic path extraction 252, enhanced prompt formulation 254 and PLM interface 256.

Figure 3:
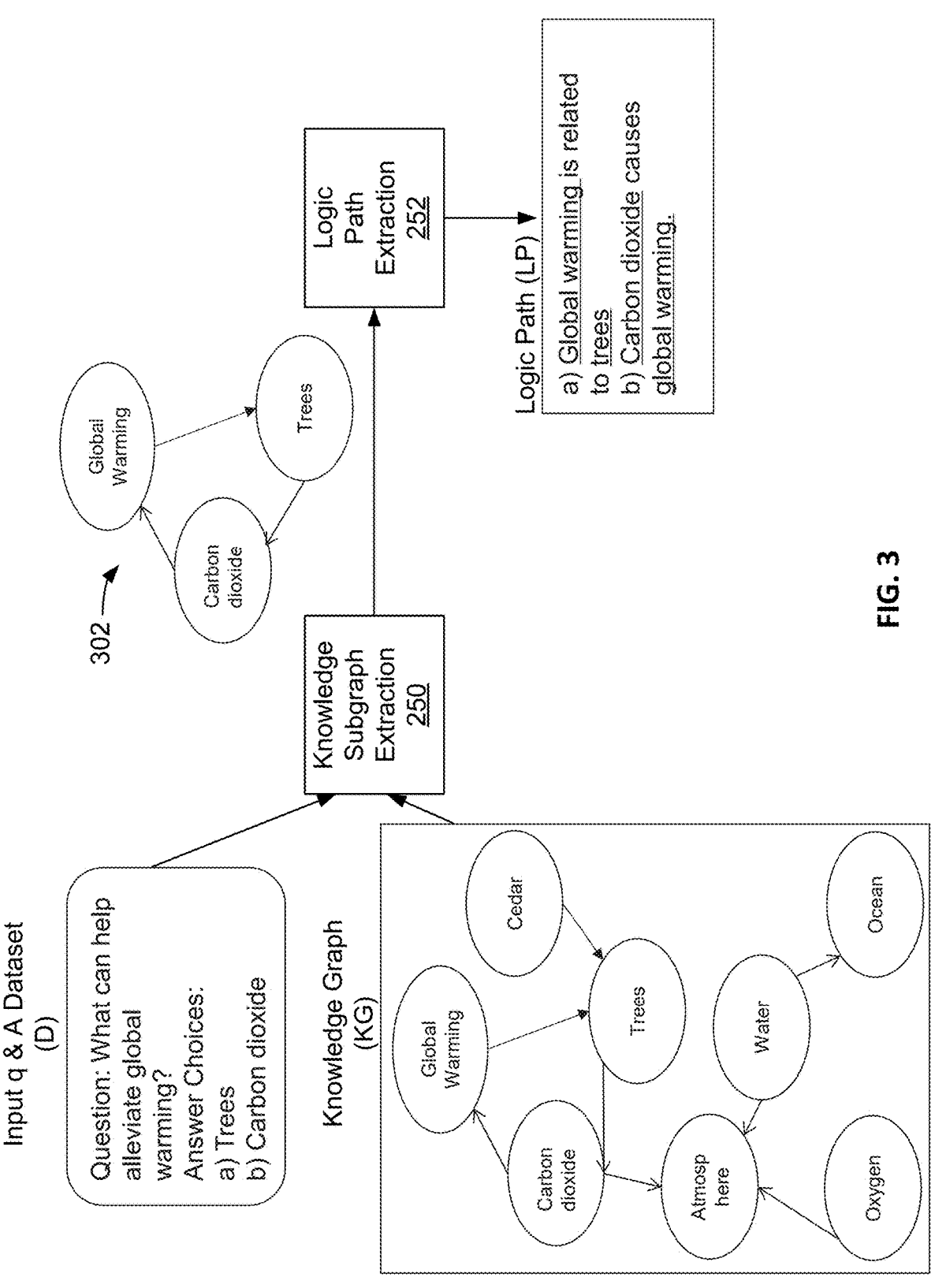
FIG. 3 is a block diagram illustrating an example of knowledge subgraph extraction and logic path extraction operations of prompt enhancement system of FIG. 2.

With reference to FIG. 3, knowledge subgraph extraction operation 250 receives the q&A dataset D and knowledge graph KG as inputs, and extracts a subgraph 302 from the knowledge graph KG based on the q&A dataset D. FIG. 3 illustrates an example of a natural language q & A dataset D, which includes the text: "Question: What can help alleviate global warming?" together with a set of candidate answers: "Answer Choices: (a) Trees (b) carbon dioxide". FIG. 3 also illustrates an example of a knowledge graph (KG) that includes the following 3-tuples: <global warming, RelatedTo, trees>; <carbon dioxide, Causes, global warming>; <trees, RelatedTo, carbon dioxide>; <cedar, IsA, trees>;

<carbon dioxide, PartOf, atmosphere>; <water, PartOf, atmosphere>; <oxygen, PartOf, atmosphere>; and <water, PartOf, ocean>.

In some examples, knowledge subgraph extraction operation 250 matches entities found in the question q and candidate answer A to entities represented as node entities in the knowledge graph KG. The matching question and answer entities and the paths between these node entities are then extracted for subgraph 302. In one example, knowledge subgraph extraction operation 250 applies a two-stage process, namely a first stage to perform q&A dataset entity to knowledge graph entity linking (also referred to as matching), followed by a second step to form the knowledge subgraph 302 based on the entity linking.

Dataset D Entity to Knowledge Graph Entity Linking: Knowledge graph entity linking is used to: (a) extract a set of critical entities from the question q and match those question entities to a subset of entities $V_q$ from the total set of entities $\mathcal{V}$ that are included in knowledge graph KG; and (b) extract a set of critical entities from the candidate answers A and match those answer entities to a subset of answer entities $V_a$ from the total set of entity nodes V that are included in knowledge graph KG.

In the case of question q, questions are often presented in the form of non-canonicalized text and contain fixed phrases. Accordingly, in example embodiments a keyphrase extraction tool is applied to extract critical phrases and words from the question q. In this regard, an example of a suitable keyphrase extraction tool is disclosed in Reference 1: [Florian Boudin. 2016. pke: an open source python-based keyphrase extraction toolkit. In Proceedings of COLING 2016, the 26th International Conference on Computational Linguistics: System Demonstrations. Osaka, Japan, 69-73.]

The extracted critical phrases and words form a set of question entities that are then compared against the node entities represented in the knowledge graph KG with matching KG node entities being included in the set of question entities $V_q$. In some examples, such matching may be based on comparing embeddings generated in respect of the extracted question entities with embeddings generated in respect of the KG node entities. The embeddings can, for example, be generated by a natural language encoder model that has been trained in the context of knowledge graph KG. The natural language encoder model can, for example, be a neural network model that has been pretrained to generate similar embeddings for terms having semantically similar meanings. In examples, a match between a question entity extracted from in dataset D and a respective node entity from knowledge graph KG can be based on cosine similarity or Euclidian distance for the respective embeddings meeting a predefined similarity criterion.

In the case of the set of candidate answers A, a similar process of extracting key phrases and words and matching the extracted key phases and words to identify potential candidates for answer entities $V_a$ can also be performed. In at least some examples, the answers in the set of candidate answers A are originally generated based on entities that are known to be present in the knowledge graph KG. In such cases, the answers included in the candidate answer set A can be extracted as answer entities directly from the q&A Dataset D based on simple rules without requiring use of the keyphrase extraction tool. The extracted answer entities are then matched in the manner described above to respective KG entities to form the set of potential candidates for answer entities $V_a$.

Knowledge Subgraph Formation: Once the sets of KG question entities $V_q$ and KG answer entities $V_a$ have been identified, a subset of the knowledge graph KG is extracted based on the relationships between the KG question entities $V_q$ and KG answer entities $V_a$. In some examples, each KG question entity and each KG answer entity pair that are located within a k-hop distance of each other (where k is predefined and k−1 denotes the number of intervening entities between the question entity and answer entity in the knowledge graph KG), are selected for inclusion in the subgraph 302, together with any intervening entities and relationships. In this regard, all reasoning paths, within a k-hop range of connections, between the entity sets $V_q$ and $V_a$ are represented in knowledge subgraph 302.

By way of illustration, in the example of FIG. 3, the question entities extracted from the q&Q dataset D is "global warming", which is then matched to knowledge graph KG entity "Global Warming". Thus, the set of KG question entities $V_q$ is "Global Warming". The subset of answer entities extracted from the q&Q dataset D are "Trees" and "Carbon dioxide", which are matched to knowledge graph KG entities "Trees" and "Carbon dioxide". Thus, the set of KG answer entities $V_a$ is "Trees" and "Carbon dioxide". In the illustrated example, a 1-hop relationship limit is used to form a 1-hop local knowledge subgraph 302, which is represented by the set of 3-tuples: <global warming, RelatedTo, trees>; <carbon dioxide, Causes, global warming>; <trees, RelatedTo, carbon dioxide>.

Logic path extraction operation 252 is then performed to rank the various paths between question and answer entities represented in knowledge subgraph 302 and select a logic path LP based on such rankings. Ideally, each path in the knowledge subgraph 302 can be regarded as a reasoning chain that helps to locate the most precise answer and its explanation to the question q. However, the typical node size of a 3-hop local knowledge graph can be very large and include many node entities that are irrelevant to the context of question q. For example, in the case of the above mentioned ConceptNet knowledge graph, a 3-hop local knowledge subgraph can easily reach 1000 entities. Accordingly, in example embodiments, the logic paths are ranked to select the best path for each candidate answer to be used in the final logic path LP.

In an example implementation, the following steps are applied to rank potential logic paths:

Step 1: each individual hop in a potential path is scored. This can be done, for example, using the sigmoid path scoring method where the hop score between two node entities a and b can be written as:

$$psig(a, b) = 1/\left(1 + e^{-(a \cdot b)}\right)$$

where a·b represents a similarity value such as cosine similarity or Euclidian distance between the node entities determined based on the embeddings generated by the aforementioned encoder.

Step 2: The individual hop scores of a potential path are scored by taking the product of each hop's score. For example, for a k-hop path $p_k$:

$$p(p_k) = \prod_{i=1}^{k} p_{sig}(a_i, b_i)$$

Based on the path scores, the best logic paths for each $V_a$ answer entity to $V_q$ are extracted from the question entity are found. For example, in the example of FIG. 3, the logic path with the highest score for the question-answer entity pair "global warming" and "trees" is: <global warming, RelatedTo, trees>, and the logic path with the highest score for the question-answer entity pair "global warming" and "carbon dioxide" is: <carbon dioxide, Causes, global warming>. The two-hop path between "global warming" and "trees", namely: <carbon dioxide, Causes, global warming> and <trees, RelatedTo, carbon dioxide> is scored lower than the one-hop path <global warming, RelatedTo, trees> and is not extracted.

Each hop in the extracted paths is translated from a 3 tuple <h, r, t> to a natural language expression. For example, <global warming, RelatedTo, trees> is converted to "Global warming is related to trees" and <carbon dioxide, Causes, global warming> is converted to "Carbon dioxide causes global warming". In example embodiments, this translation can, for example, be performed by a basic rules-based algorithm. These natural language conversions of the selected path tuples are then output as the final logic path (LP).

Figure 4:
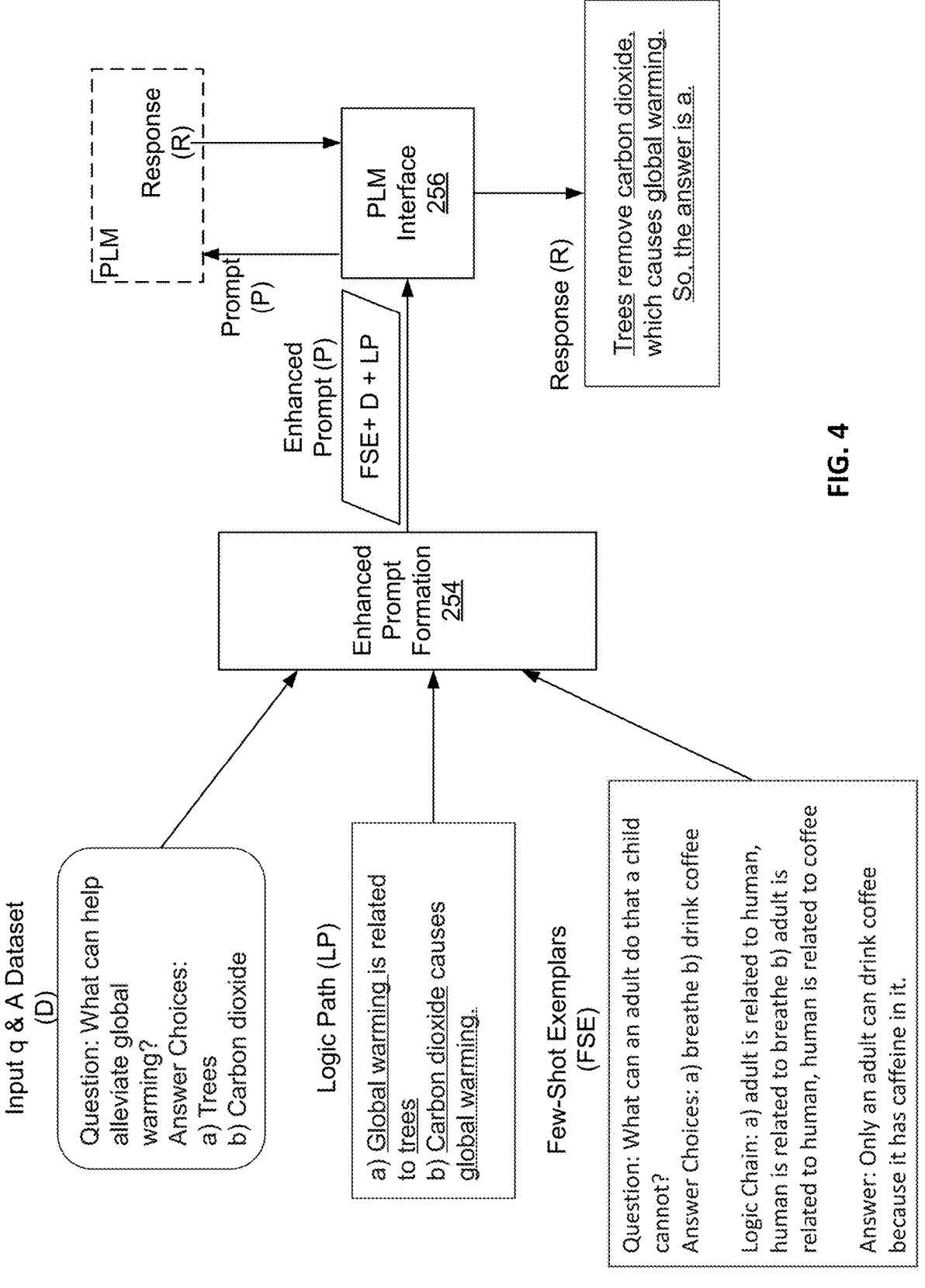
FIG. 4 is a block diagram illustrating an example of enhanced prompt formation and pre-trained language model interface of prompt enhancement system of FIG. 2.

With reference to FIG. 4, once the logic path LP is generated it is provided, together with the q&A dataset D and the Few-Shot Exemplars FSEs, to the enhanced prompt formation operation 254. In the illustrated example, the enhanced prompt formation operation 254 appends the text of logic path LP to the text of the q&A dataset D and prepends the Few-Shot Exemplars FSE to generate an enhanced natural language prompt P, for example: <FSE, D, LP>.

The enhanced language prompt P is provided to PLM interface 256, which in turn provides the enhanced language prompt P to one or more PLMs (for example, a PLM hosted by a PLM service 106) and obtains a response R. The response R includes an answer that is selected from among the candidate answers, together with a chain-of-thought statement that explains the reasoning for selecting the answer. The PLM interface 256 then provides the response R to the requesting user device 102. As shown in the example of FIG. 4, the response R indicates that the selected answer is "trees" and provides the chain-of-thought statement "Trees remove carbon dioxide which causes global warming, so the answer is a) Trees".

In some examples, the PLM service 106 may be provided with an address for the user device 102 such that the response R can be provided directly through network 108 to the user device 106 without passing through the prompt enhancement system. In some examples, the PLM may be co-hosted with the prompt enhancement system 104 such that the PLM interface 256 is not required. In some examples, prompt enhancement system 104 may be hosted on user device 102.

In some examples, for example in a zero-shot configuration, the few shot exemplars (FSE) may be omitted from the generated prompt (P), in which case the prompt will include only the q&A dataset D and the logic path (LP).

In example implementations, the operations described above include the following steps: obtaining a natural language input query that includes at least one question and a respective set of candidate answers for the at least question; generating, based on the input query and a knowledge graph, natural language logic paths between at least some of the candidate answers and the question; forming a natural language prompt based on both the input query and the logic paths; and obtaining a response from a pretrained natural language processing model based on the natural language prompt. The response can include an identification of a selected answer from the set of candidate answers, together with a chain of thought statement explaining a reason for the answer selection.

As described above, generating the natural language logic paths can include: identifying a question entity for the question included in the input query; identifying a respective candidate answer entity for each of the candidate answers included in the input query; identifying, for the question entity, a matching question node entity of the knowledge graph; identifying, for at least some of the candidate answer entities, respective matching node answer entities of the knowledge graph; and identifying, based on inter-node entity relationships specified in the knowledge graph, a respective logic path for each matching node answer entity to the matching question node entity. The natural language logic paths correspond to the identified respective logic paths. Identifying the matching question node entity for the question entity is based on a comparison of an embedding generated for the question entity with embeddings generated for node entities of the knowledge graph. Identifying the respective matching node answer entities for the at least some of the candidate answer entities is based on a comparison of embeddings generated for the candidate answer entities with embeddings generated for the node entities of the knowledge graph. The embeddings are each generated by a neural network model that has been pretrained to generate similar embeddings for terms having semantically similar meanings.

In example implementations, identifying the respective logic path for each matching node answer entity to the matching question node entity includes the following: identifying, for each matching node answer entity, a respective set of candidate logic paths for the matching node answer entity to the matching question node entity; ranking each of the candidate logic paths within each of the respective sets of candidate logic paths; and selecting as the respective logic path for each matching node answer entity the candidate logic path having the highest ranking from the respective set of candidate logic paths for the matching node answer entity.

It will be appreciated that in example implementations, the prompt enhancement system 104 is configured to interact with the other components of environment 100 to enable the solving of multiple-choice commonsense reasoning questions using knowledge from a PLM and a structured knowledge graph KG. For multiple-choice commonsense reasoning questions q (i.e., given a question q and provided answer candidates A), prompt enhancement system 104 is configured to prompt a PLM with relevant structured knowledge for each answer choice so that it may reason the best solution.

Among other things, possible use cases can enable protection of sensitive information. For example, many companies hold proprietary information related to their business, products or employees that cannot be shared publicly to be incorporated into the intrinsic knowledge held by a PLM. This knowledge is usually structured, such as an employee's start date and salary or a product's test application results. If a company wants to ask a PLM questions such as, "What salary range should we offer candidate X for the position of Y?" a proprietary knowledge graph with information on current employees' positions and salaries, which can be extremely conducive to creating a useful answer, can be sued to enhance prompting provided to the PLM. Allowing a PLM to access such knowledge without the need for costly retraining or breaching privacy laws can extremely beneficial to users.

As noted above, in some examples prompt enhancement system 104 can be implemented as a cloud service that can be accessed through by a client such as user device 102. In this regard, FIGS. 5 through 7 provide illustrative examples of interactive user interface screens that can be presented on a display of a user device 102 through either a general browser interface to web pages hosted by prompt enhancement system 104 or by a downloaded client side application that is configured to communicate with an application programing interface (API) associated with the prompt enhancement system 104.

Figure 5:
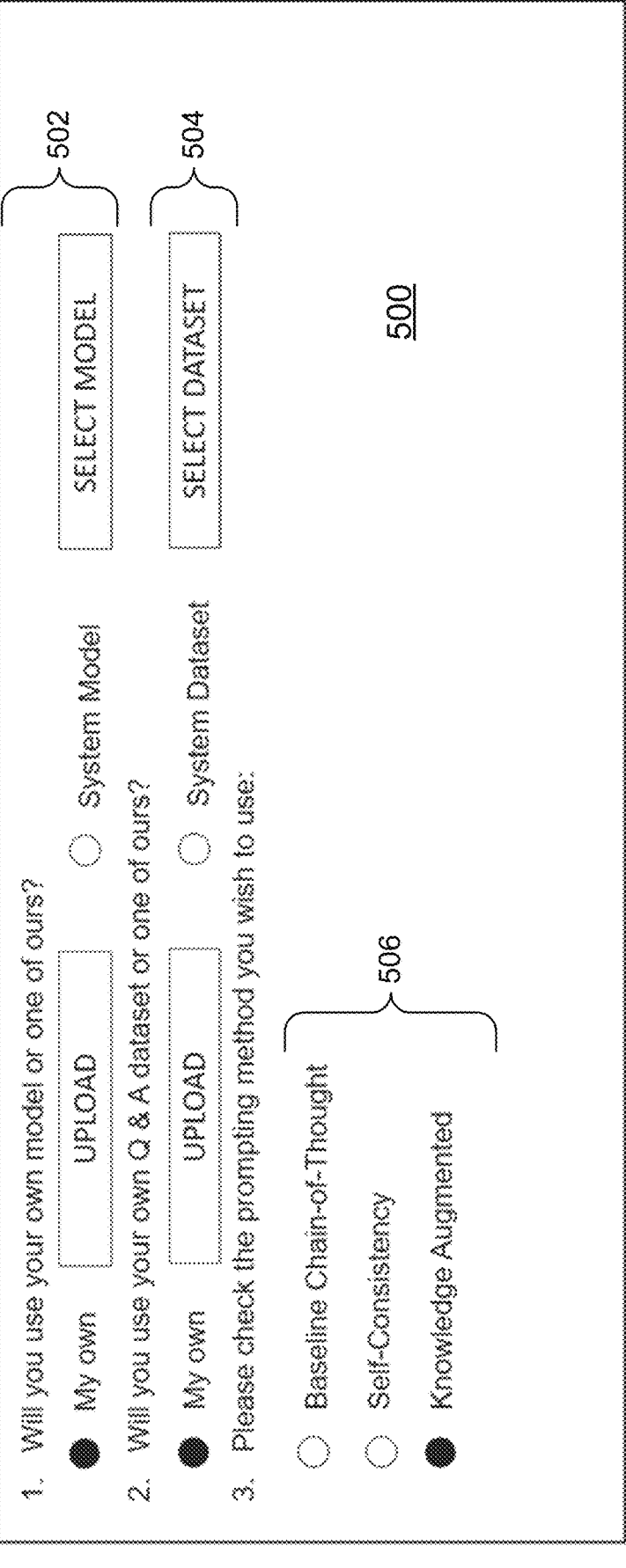
FIG. 5 is an illustrative example of a first graphical user interface presented by a user device, according to example implementations.
Figure 6:
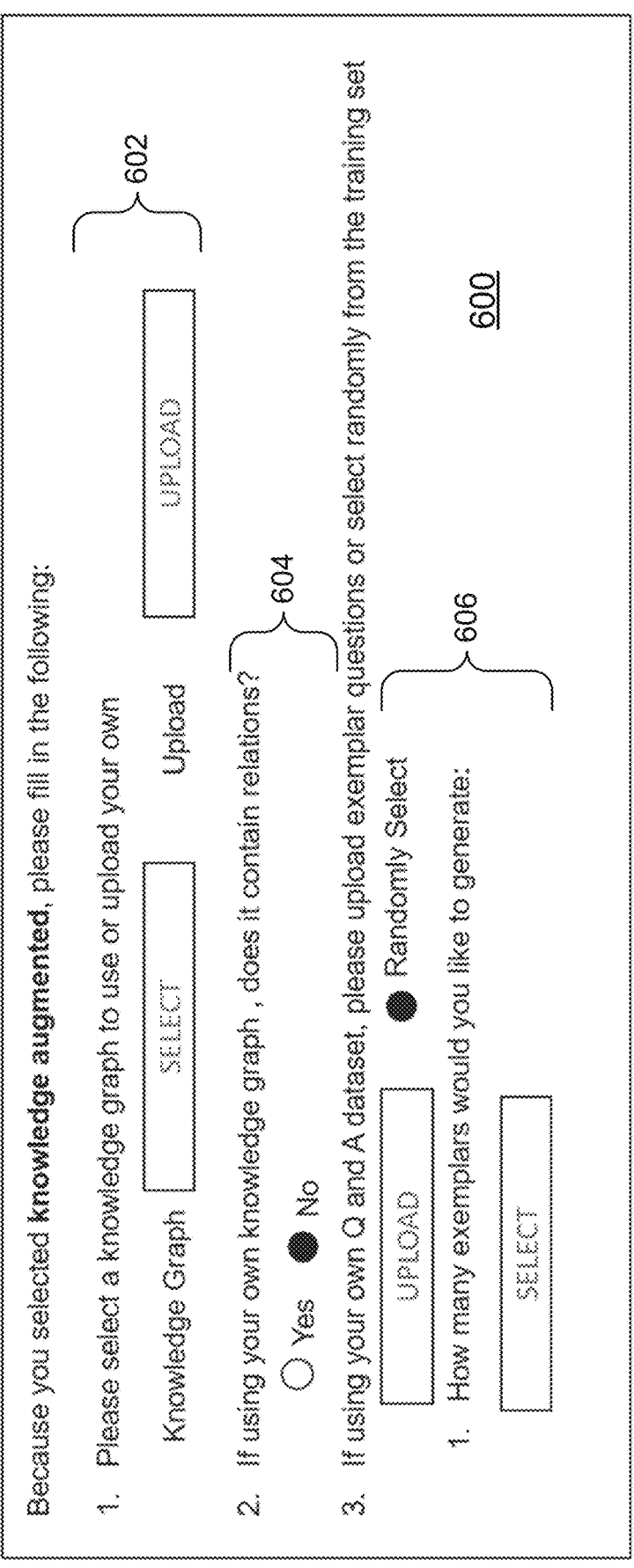
FIG. 6 is an illustrative example of a second graphical user interface presented by the user device, according to example implementations.

FIG. 5 is an illustrative example of a first graphical user interface (GUI) screen 500 presented by user device 102, according to example implementations. The graphical user interface screen 500 includes a group of GUI elements 502 that enable a user to either upload a custom PLM model, or alternatively, select from a set of existing PLM models that are available to the prompt enhancement system 104. By way of non-limiting example, user selectable PLM models could include: ChatGPT (for example 3, 3.5 or 4); BARD; LlaMA, Falcon; Cohere; PaLM; and Claude, among others.

The graphical user interface screen 500 also includes a group of GUI elements 504 that enable a user to either upload a custom q & A dataset D or alternatively, select from a set of existing q&A datasets available to the prompt enhancement system 104. Typically, the user will provide their own q & A dataset D, however the use of existing datasets may be useful for testing a PLM model or knowledge graph. Examples of existing q & A datasets include CommonsenseQA and OpenBookQA.

In some examples, user interface screen 500 also includes a group of GUI elements 506 that enable a user to select the type of prompting that is to be generated by the prompt enhancement system 104. The "Knowledge Augmented" selection corresponds the prompting that is the focus of this disclosure.

FIG. 6 is an illustrative example of a second graphical user interface screen presented by the user device 102. The graphical user interface screen 600 includes a group of GUI elements 602 that enable a user to either upload a proprietary or custom knowledge graph KG, or alternatively, select a graph from a set of existing PLM knowledge graph KGs available to the prompt enhancement system 104. As mentioned above, ConceptNet is an example of an existing knowledge graph KG.

A group of GUI elements 604 enables a user to indicate, if they are using a custom knowledge graph KG, if the graph includes entity relationship information or not. (e.g., if graph tuples are 3-tuples <h,r,t> or simple 2-tuples <h,t>)

A group of GUI elements 606 enables a user to indicate if they want to upload a custom set of few shot exemplars FSE, or alternatively just rely on a randomly generated set of few shot exemplars FSE. The user can also specify the number of exemplars (i.e., the number of "shots"), allowing a user to select, for example, 0-shot, 1-shot, 2-shot, 3-shot or 4-shot.

FIG. 7 is an illustrative example of a third graphical user interface 700 presented by the user device that enables a user to select illustrative examples of suitable exemplars 702 as a basis for randomly generated few shot exemplars (FSE). In some examples, the exemplars can be selected from a set of manually drafted exemplars. In some examples, the exemplars can be generated using a PLM model. As can be seen in FIG. 7, each exemplar takes the format of <Question; Answer Choices; Logic Path; Response>. Graphical user interface 700 can also include the option to select the type of parameters that are used to call the PLM.

The information obtained via GUIs 500, 600, 700 can be used by prompt enhancement system 104 to perform a prompt generation task and obtain a response in the manner described above.

As noted above, in example embodiments, logic path extraction operation 252 can be configured to generate logic path scores based on the product of individual hop scores. In an alternative example, individual hop scores are normalized to reduce the influence of hop length on path prediction, as illustrated in the following equation:

$$p(p_k) = \frac{\sum_{i=1}^{k} p_{sig}(a_i, b_i)}{k}.$$

In at least some applications, the prompt enhancement system 104 enables a PLM to efficiently and accurately answer a question without retraining of the PLM, thereby improving the operation of the computer systems that are used to implement a large natural language model processing solution. Among other things, these improvements can include: (1) saving energy consumption and computational resources (e.g., number of processing computations) by avoiding retraining of a PLM; (2) improving the versatility of a PLM by enabling an existing PLM to be applied to a problem domain that was not part of the PLM training; (3) protection of confidential information as a PLM does not need to be trained with confidential information to ultimately answer questions that rely on such information; (4) combines structural and implicit logical path information that is found in an knowledge graph with the inherent knowledge of the PLM to enable more accurate or relevant answers, thereby improving overall operation of a computational system; and (5) include a chain-of-thought in the a response that provides a user with confidence that a correct answer has been provided.

By way of further examples, Table 1 below provides examples of some possible exemplars.

TABLE 1

| EXAMPLE EXEMPLARS |
| --- |

| (1) | Question: What do people use to absorb extra ink from a fountain pen?<br>Answer Choices: (a) shirt pocket (b) calligrapher's hand (c) inkwell (d) desk drawer (e) blotter<br>Logic Path: fountain pen is typically found in shirt pocket, fountain pen is typically found in calligrapher's hand, fountain pen is related to inkwell, fountain pen is typically found in desk drawer, fountain pen is typically found in blotter<br>Response: The answer must be an item that can absorb ink. A blotter is used to absorb excess ink when writing with a fountain pen. Of the above choices, only a blotter is typically used to absorb extra ink from a fountain pen. So the answer is (e) blotter. |
| (2) | Q: What home entertainment equipment requires cable?<br>Answer Choices: (a) radio shack (b) substation (c) television (d) cabinet<br>Logic Path: cable is typically found in radio shack, cable is typically found in substation, cable is a television, cable is typically found in cabinet<br>Response: The answer must be home entertainment equipment that requires cable. A cable is used to provide power to televisions. Of the above choices, only television is a type of home entertainment equipment that requires cable. So the answer is (c) television. |
| (3) | Q: The fox walked from the city into the forest, what was it looking for? |

TABLE 1-continued

EXAMPLE EXEMPLARS

Answer Choices: (a) pretty flowers (b) hen house (c)
natural habitat (d) storybook
Logic Path: fox is typically located in pretty flowers,
fox is typically located in hen house, fox is typically
located in natural habitat, fox is typically located
in storybook
Response: The answer must be something the fox would
be looking for in the forest. Foxes are animals that
live in nature and their natural habitat is in a forest.
Of the above choices, only natural habitat is something
the fox would be looking for in the forest.
So the answer is (c) natural habitat.

Figure 8:
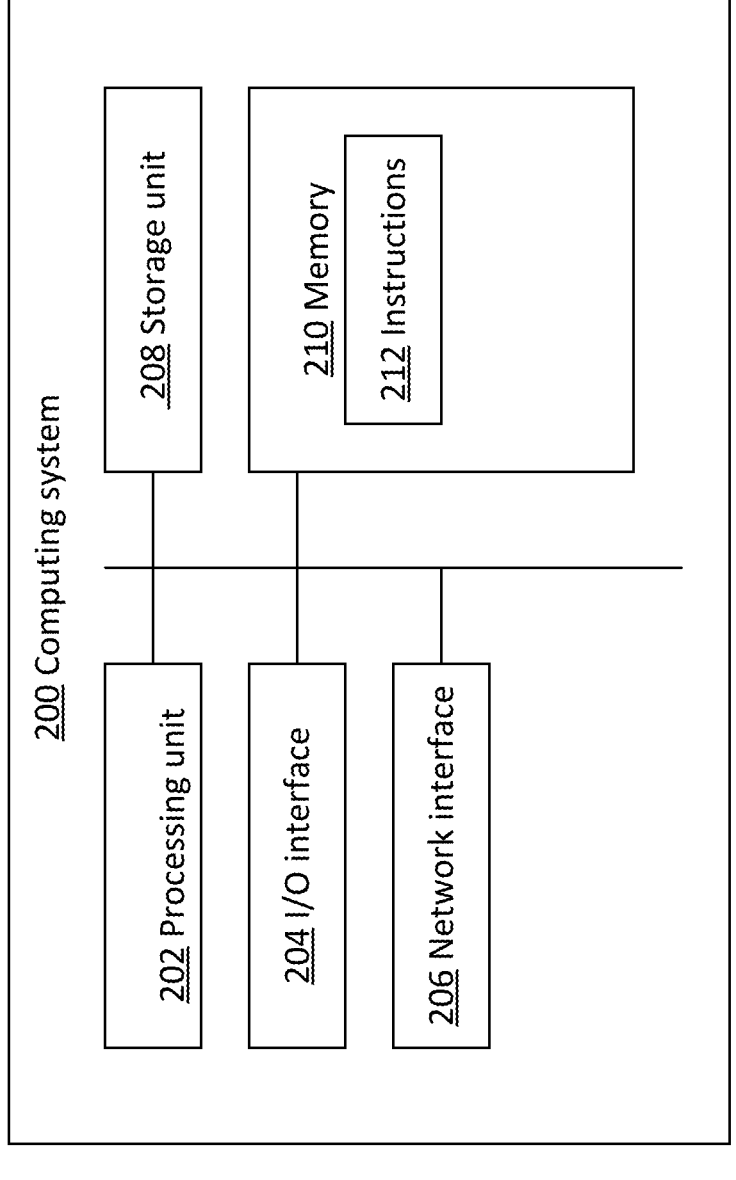
FIG. 8 is a block diagram of a computing system that can be configured to implement one of more components in the environment of FIG. 4.

FIG. 8 is a schematic diagram illustrating an example of a computer system 200 that can be configured to implement one or more of the components shown in the environment of FIG. 1, such as user device 102, prompt enhancement system 104 and/or PLM service 106, according to example implementations. The computer system 200 may be implemented in a single physical machine or device (e.g., implemented as a single computing device, such as a single workstation, single server, etc.), or may be implemented using a plurality of physical machines or devices (e.g., implemented as a server cluster). The computing system 200 may represent a server or a workstation, for example. Although FIG. 8 shows a single instance of each element, there may be multiple instances of each element in the computing system 200.

In this example, the computing system 200 includes at least one processing unit 202, which may be a processor, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, combinations thereof, or other such hardware structure.

The computing system 200 may include an input/output (I/O) interface 204, which may enable interfacing with an input device and/or output device (not shown).

The computing system 200 may include a network interface 206 for wired or wireless communication with other computing systems. The network interface 206 may include wired links (e.g., Ethernet cable) and/or wireless links (e.g., one or more antennas) for intra-network and/or inter-network communications. The network interface 206 may also enable the computing system 200 to communicate queries or responses to another computing system (e.g., a response from prompt enhancement system 104 to user device 102).

The computing system 200 may include a storage unit 208, which may include a mass storage unit such as a solid state drive, a hard disk drive, a magnetic disk drive and/or an optical disk drive.

The computing system 200 may include a memory 410, which may include a volatile or non-volatile memory (e.g., a flash memory, a random access memory (RAM), and/or a read-only memory (ROM)). The non-transitory memory 210 may store instructions for execution by the processing unit 202, such as to carry out example embodiments described in the present disclosure. For example, the memory 210 may store instructions 212 for implementing one or more of the components shown in the environment 100 of FIG. 1. The memory 210 may include other software instructions, such as for implementing an operating system and other applications/functions.

The computing system 200 may additionally or alternatively execute instructions from an external memory (e.g., an external drive in wired or wireless communication with the server) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method for processing a natural language input query that includes a question and a respective set of candidate answers for the question, the method comprising:
   generating, based on the input query and a knowledge graph, natural language logic paths between at least some of the candidate answers and the question, the generating includes:
      identifying a question entity for the question included in the input query;

identifying a respective candidate answer entity for each of the candidate answers included in the input query;

identifying, for the question entity, a matching question node entity of the knowledge graph;

identifying, for at least some of the candidate answer entities, respective matching node answer entities of the knowledge graph; and identifying, based on inter-node entity relationships specified in the knowledge graph, a respective logic path for each matching node answer entity to the matching question node entity as the natural language logic paths;

forming a natural language prompt based on both the input query and the logic paths; and obtaining a response, based on the natural language prompt, from a pretrained natural language processing model based on a large neural network operating under a pretrain-finetune paradigm.

2. The method of claim 1 wherein:

identifying the matching question node entity for the question entity is based on a comparison of an embedding generated for the question entity with embeddings generated for node entities of the knowledge graph; and identifying the respective matching node answer entities for the at least some of the candidate answer entities is based on a comparison of embeddings generated for the candidate answer entities with embeddings generated for the node entities of the knowledge graph, the embeddings each being generated by a neural network model that has been pretrained to generate similar embeddings for terms having semantically similar meanings.

3. The method of claim 2 wherein identifying the respective logic path for each matching node answer entity to the matching question node entity comprises:

identifying, for each matching node answer entity, a respective set of candidate logic paths for the matching node answer entity to the matching question node entity;

ranking each of the candidate logic paths within each of the respective sets of candidate logic paths; and selecting as the respective logic path for each matching node answer entity the candidate logic path having the highest ranking from the respective set of candidate logic paths for the matching node answer entity.

4. The method of claim 3 wherein identifying the respective set of candidate logic paths for each matching node answer entity is limited to paths that fall within a predefined number of entity node hops.

5. The method of claim 1 wherein identifying the question entity for the question comprises applying a keyphrase extraction tool to the question to extract the question entity.

6. The method of claim 1 wherein forming the natural language prompt comprises combining content from the input query, the logic paths and one or more exemplars to form the natural language prompt, wherein each exemplar includes a representation of an example natural language prompt combined with an example response thereto, each example natural language prompt comprising a respective example question and set of example candidate answers together with example logic paths between the example question and the example candidate answers.

7. The method of claim 1 wherein the response indicates a selected answer from the set of candidate answers and a natural language chain-of-thought statement for the selected answer.

8. The method of claim 1 comprising receiving the input query over a network from a requesting device and providing the response over the network to the requesting device.

9. The method of claim 1 comprising receiving the knowledge graph over a network from a requesting device.

10. A computing system comprising:

a processing unit configured to execute computer-readable instructions to cause the system to perform a method for processing a natural language input query that includes a question and a respective set of candidate answers for the question, the method including:

generating, based on the input query and a knowledge graph, natural language logic paths between at least some of the candidate answers and the question, the generating includes:

identifying a question entity for the question included in the input query;

identifying a respective candidate answer entity for each of the candidate answers included in the input query;

identifying, for the question entity, a matching question node entity of the knowledge graph;

identifying, for at least some of the candidate answer entities, respective matching node answer entities of the knowledge graph; and identifying, based on inter-node entity relationships specified in the knowledge graph, a respective logic path for each matching node answer entity to the matching question node entity as the natural language logic paths;

forming a natural language prompt based on both the input query and the logic paths; and obtaining a response, based on the natural language prompt, from a pretrained natural language processing model based on a large neural network operating under a pretrain-finetune paradigm.

11. The computing system of claim 10 wherein:

identifying the matching question node entity for the question entity is based on a comparison of an embedding generated for the question entity with embeddings generated for node entities of the knowledge graph; and identifying the respective matching node answer entities for the at least some of the candidate answer entities is based on a comparison of embeddings generated for the candidate answer entities with embeddings generated for the node entities of the knowledge graph, the embeddings each being generated by a neural network model that has been pretrained to generate similar embeddings for terms having semantically similar meanings.

12. The computing system of claim 11 wherein identifying the respective logic path for each matching node answer entity to the matching question node entity comprises:

identifying, for each matching node answer entity, a respective set of candidate logic paths for the matching node answer entity to the matching question node entity;

ranking each of the candidate logic paths within each of the respective sets of candidate logic paths; and selecting as the respective logic path for each matching node answer entity the candidate logic path having the highest ranking from the respective set of candidate logic paths for the matching node answer entity.

13. The computing system of claim 12 wherein identifying the respective set of candidate logic paths for each matching node answer entity is limited to paths that fall within a predefined number of entity node hops.

14. The computing system of claim 10 wherein identifying the question entity for the question comprises applying a keyphrase extraction tool to the question to extract the question entity.

15. The computing system of claim 10 wherein forming the natural language prompt comprises combining content from the input query, the logic paths and one or more exemplars to form the natural language prompt, wherein each exemplar includes a representation of an example natural language prompt combined with an example response thereto, each example natural language prompt comprising a respective example question and set of example candidate answers together with example logic paths between the example question and the example candidate answers.

16. The computing system of claim 10 wherein the response indicates a selected answer from the set of candidate answers and a natural language chain-of-thought statement for the selected answer.

17. The computing system of claim 10, wherein the processing unit is configured to execute computer-readable instructions to cause the system to receive the input query over a network from a requesting device and provide the response over the network to the requesting device.

18. A non-transitory computer-readable medium having instructions stored thereon, wherein the instructions are executable by a processing unit of a computing system to cause the computing system to perform a method of processing a natural language input query that includes a question and a respective set of candidate answers for the question, the method comprising:

generating, based on the input query and a knowledge graph, natural language logic paths between at least some of the candidate answers and the question, the generating includes:

identifying a question entity for the question included in the input query;

identifying a respective candidate answer entity for each of the candidate answers included in the input query;

identifying, for the question entity, a matching question node entity of the knowledge graph;

identifying, for at least some of the candidate answer entities, respective matching node answer entities of the knowledge graph; and identifying, based on inter-node entity relationships specified in the knowledge graph, a respective logic path for each matching node answer entity to the matching question node entity as the natural language logic paths;

forming a natural language prompt based on both the input query and the logic paths; and obtaining a response, based on the natural language prompt, from a pretrained natural language processing model based on a large neural network operating under a pretrain-finetune paradigm.

* * * * *